R.B. & A.C. Jennings.
Horse Rake.
No 5833.    Patented. Oct. 3, 1848.
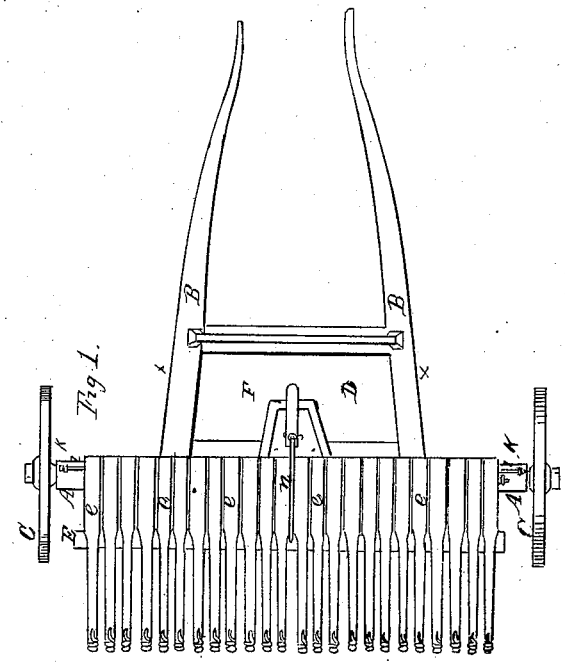
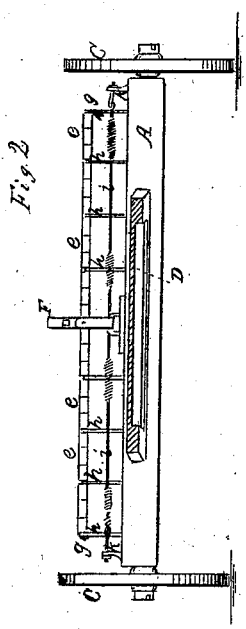
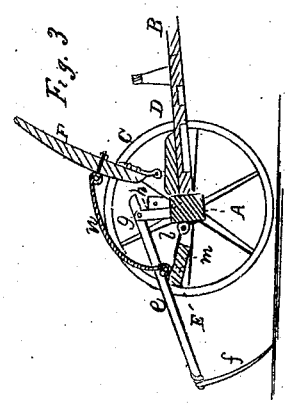

UNITED STATES PATENT OFFICE.

R. B. JENNINGS AND A. C. JENNINGS, OF LIVERMORE, MAINE.

IMPROVEMENT IN HORSE-RAKES.

Specification forming part of Letters Patent No. 5,833, dated October 3, 1848.

*To all whom it may concern:*

Be it known that we, REUBEN B. JENNINGS and ABIATHAR C. JENNINGS, of Livermore, in the county of Oxford and State of Maine, have invented a new and Improved Horse-Rake; and we do hereby declare the following to be a full, clear, and exact description thereof, reference being had to the accompanying drawings, making a part of this specification, in which—

Figure 1 is a top view; Fig. 2, a transverse section in the line $x\,x$ of Fig. 1, and Fig. 3 a vertical longitudinal section.

Similar letters indicate like parts in all the figures.

A is the axle-tree; B B, the shafts, and C C the wheels, constructed and combined in the usual manner. D is a platform between the rear ends of the shafts and the axle-tree.

The nature of our invention consists, first, in giving to each tooth of our improved rake an independent movement for the purpose of adapting the series of teeth to irregular and undulating surfaces; second, constructing the teeth and combining them with vibrating longitudinal bars in such a manner as to give them lightness, elasticity, and strength; third, combining a reacting-spring with the vibrating tooth-bars for the purpose of preventing the bars from being thrown over backward upon the platform by the rebounding of the teeth when they strike an obstacle.

The inclined vibrating bars $e\,e$, to which the teeth $f\,f$ are connected, are placed side by side and confined to each other, and jointed to the axle-tree by the rod $g$, passing through the bars and through apertures in the series of thin standard supports $h\,h$, rising from the upper side of the axle-tree, between every third or fourth bar. The rake-teeth $f\,f$ are formed of elastic metallic rods, and are confined to the rear ends of the tooth-bars $e\,e$ by means of a helical coil near the upper end of each tooth, which embraces the end of its tooth-bar, with its upper extremity passed through the bar, or otherwise confined thereto. By this method of fastening the teeth to longitudinal vibrating bars much greater strength is given to the teeth than when they are fastened by means of helical coils at their upper extremities embracing transverse bars.

Under the front ends of the vibrating tooth-bars $e\,e$ there extends a continuous elastic wire, $i$, the whole length of the axle-tree, supported by the standards $k\,k$, rising from the axle-tree, and set-screws at each extremity, as shown in Fig. 2. The object of this spring is to prevent the bars $e$ from rebounding too high when the teeth strike against and are suddenly released from obstructions, and for preventing the bars from being thrown over onto the platform. The teeth are simultaneously lifted to discharge the hay gathered by them by a person standing on the platform D, by means of the lever F, hinged to and rising from the platform, and connected by the curved rod $n$ to the bar E, which passes transversely under the tooth-bars and is connected to the rear side of the axle-tree by the arms $m$ and hinges $l$, as shown in Fig. 3.

Having thus fully described our improved horse-rake, what we claim therein as new, and desire to secure by Letters Patent, is—

The combination of the reacting spring-guard $i$ with the tooth-bars, substantially in the manner and for the purpose herein set forth.

REUBEN B. JENNINGS.
ABIATHAR C. JENNINGS.

Witnesses:
SAML. P. HOLMAN,
JOHN H. HOLMAN.